(12) United States Patent
Capan

(10) Patent No.: US 9,255,726 B2
(45) Date of Patent: Feb. 9, 2016

(54) SUPPORT MECHANISM FOR THERMAL RECEIVERS IN THE SOLAR TROUGH SYSTEMS

(75) Inventor: Rahmi Oguz Capan, Izmir (TR)

(73) Assignee: HSE Hitit Solar Enerji Anonim Sirketi, Istanbul (TR)

( * ) Notice: Subject to any disclaimer, the term of this patent is extended or adjusted under 35 U.S.C. 154(b) by 237 days.

(21) Appl. No.: 13/982,623

(22) PCT Filed: Dec. 16, 2011

(86) PCT No.: PCT/EP2011/073114
§ 371 (c)(1),
(2), (4) Date: Jul. 30, 2013

(87) PCT Pub. No.: WO2012/113478
PCT Pub. Date: Aug. 30, 2012

(65) Prior Publication Data
US 2013/0319401 A1  Dec. 5, 2013

(30) Foreign Application Priority Data
Feb. 22, 2011  (TR) .............................. a 2011 01718

(51) Int. Cl.
*F24J 2/54* (2006.01)
*F24J 2/07* (2006.01)
(Continued)

(52) U.S. Cl.
CPC .. *F24J 2/541* (2013.01); *F24J 2/07* (2013.01); *F24J 2/12* (2013.01); *F24J 2/14* (2013.01); *F24J 2/38* (2013.01); *F24J 2/4636* (2013.01);
(Continued)

(58) Field of Classification Search
CPC .................. F24J 2/541; F24J 2/12; F24J 2/38
USPC .................. 126/600, 694, 700; 482/100, 136; 136/248
See application file for complete search history.

(56) References Cited

U.S. PATENT DOCUMENTS 3,466,119 A * 9/1969 Francia .......................... 359/851
4,559,926 A  12/1985 Butler
(Continued)

FOREIGN PATENT DOCUMENTS

WO  WO 2010/043744 A2  4/2010
WO  WO 2010/142666 A2  12/2010

OTHER PUBLICATIONS

Norton, R.L., "Design of Machinery—Hoekens Linkage," Jan. 1, 2008, p. 134, XP55034377, Retrieved from the Internet: URL: http://www.designofmachinery.com/DOM/Chap_03_3ed_p134.pdf.
(Continued)

*Primary Examiner* — Gregory Huson
*Assistant Examiner* — Nikhil Mashruwala
(74) *Attorney, Agent, or Firm* — Brinks Gilson & Lione

(57) ABSTRACT

A solar trough system of the invention comprises at least one trough-shaped reflector surface (1) directing beams coming from the sun to the focal axis (F); at least one thermal receiver (2) disposed at the focal axis (F) and extending along the reflector (1). Furthermore, the system comprises at least one first arm (L1) and a second arm (L2), one end of each of which are connected to two fixed points (P1, P2) with swivel joint; at least one third arm (L3) which is connected to the other ends of these two arms (L, L2) from two points (P3, P4) with swivel joint wherein the thermal receiver (2) is connected with swivel joint to a linear movement point (E1) on the third arm (L3) which moves with rotation of the first and second arms (L1, L2).

8 Claims, 4 Drawing Sheets

(51) Int. Cl.
  *F24J 2/14* (2006.01)
  *F24J 2/46* (2006.01)
  *F24J 2/12* (2006.01)
  *F24J 2/38* (2014.01)
  *F24J 2/52* (2006.01)

(52) U.S. Cl.
  CPC ......... *F24J 2/5266* (2013.01); *F24J 2002/5455* (2013.01); *Y02E 10/41* (2013.01); *Y02E 10/45* (2013.01); *Y02E 10/46* (2013.01)

(56) References Cited

U.S. PATENT DOCUMENTS

| | | | | |
|---|---|---|---|---|
| 5,758,938 | A * | 6/1998 | Osterwisch | 353/3 |
| 6,563,040 | B2 * | 5/2003 | Hayden et al. | 136/244 |
| 2008/0245360 | A1 * | 10/2008 | Almy et al. | 126/600 |
| 2009/0050191 | A1 * | 2/2009 | Young et al. | 136/246 |
| 2012/0125401 | A1 * | 5/2012 | DeVillier | 136/246 |
| 2012/0180780 | A1 * | 7/2012 | Tseng et al. | 126/606 |
| 2013/0000693 | A1 * | 1/2013 | Waterhouse et al. | 136/246 |

OTHER PUBLICATIONS

Wikipedia, "Chebyshev Linkage—Wikipedia, the free encyclopedia," Oct. 2, 2007, pp. 1-4, XP55034397, Retrieved from the Internet: URL: http://en.wikipedia.org/wiki/Chebyshev_linkage.

Wikipedia, "Peaucellier-Lipkin Linkage—Wikipedia, the free encyclopedia," Sep. 9, 2012, pp. 1-4, XP55034396, Retrieved from the Internet: URL: http://en.wikipedia.org/wiki/Peaucellier%E2%80%93Lipkin_linkage.

International Search Report, dated Aug. 17, 2012, pp. 1-10, International Patent Application No. PCT/EP2011/073114, International Searching Authority—European Patent Office, Rijswijk, The Netherlands.

* cited by examiner

SUPPORT MECHANISM FOR THERMAL RECEIVERS IN THE SOLAR TROUGH SYSTEMS

TECHNICAL FIELD

This invention relates to energy producing solar trough systems by concentrating sunlight beams on a focus.

PRIOR ART

It is known in the state of art that solar trough systems are used for the purpose of obtaining electricity and heat from the solar energy. These systems comprise trough-shaped long parabolic reflectors; thermal receiver elements, which are placed on the focus of the reflectors and where the beams coming from the reflector are collected; and a rotating mechanism which directs the reflectors to the position in which the sun is present. The beams, coming to the reflectors which are directed to the sun, are reflected and collected on the thermal receiver element, which is disposed on the focus of the reflector. Thermal receiver element is provided with two nested tubes where a vacuum environment is disposed in the space therebetween. A fluid, which ensures heat transfer, passes through the inner tube. The outer tube is made of glass. By concentrating the beams coming from the reflectors on the thermal receiver tube, the tube reaches very high temperatures; therefore, the fluid disposed in the inner tube can be heated. Thanks to the fluid reaching high temperatures, heat energy is obtained.

As known, thanks to support structures, thermal receivers in the solar trough systems are connected to the parabolic reflectors or to the ground they are present. In order to take the advantage of solar trough systems efficiently, it is also known that these systems are made in the length for meters. In this case, observable changes are occurred in the length of heated thermal receivers in accordance with the temperature change. Therefore, for example, in case of using bar-shaped supports standing fixed along the trough (bar-shaped supports which hold thermal receivers and used in fixed state given in the published patent application no U.S. Pat. No. 4,559,926 can be shown as an example), when the length of the thermal receiver is changed, receiver axis is slid, bending in the receivers (since the receiver is connected to these supports) is observed. In other words, the thermal receiver can be distanced from the focus of the reflectors and even confront with the risk of break. Thus leads normally to decrease in the efficiency of the solar trough system or failure in the solar trough system.

For solving said problem, again in the state of art, a support structure (details are explained as follows) which holds the receiver on the focus of the parabolic reflector in the case that thermal receiver is fully heated (which is the longest state) and which is composed of the arms at fixed length is enhanced. However, in times that there is a little sunlight, the length of the thermal receiver is shortened and the thermal receiver again comes into the state in which it is distanced from the focal axis of the parabolic reflector. In this case, in times of there is a little sunlight, it leads to decrease in the efficiency (besides loss occurs due to lack of light).

BRIEF DESCRIPTION OF THE INVENTION

A solar trough system of the invention comprises at least one trough-shaped reflector surface directing beams coming from the sun to the focal axis; at least one thermal receiver disposed at the focal axis of the surface and extending along the reflector. Furthermore, the system comprises a support mechanism which comprises at least one first arm and at least one second arm, one end of each of which is connected to two fixed points with swivel joint; at least one third arm which is connected to the other ends of these two arms from two points with swivel joint. The thermal receiver is connected to a linear movement point on the third arm, which moves with the rotation of the first and second arms, with swivel joint. This state ensures the receiver to get longer and shorter easily along its axis due to expansions as well as to form a reliable support structure for the receiver held by a plurality of mechanism.

OBJECTIVES OF THE INVENTION

The aim of the invention is to ensure that thermal receiver is on the focus of the trough shaped reflector (in other words, receiver axis and focal axis of the reflector are coincident) in any condition (independent from the sunlight level) in the solar trough systems.

The other aim of the invention is to ensure that the solar trough systems operate with the highest level of efficiency in the all kinds of sunlight level.

Another aim of the invention is to reach aforementioned aims by means of a mechanism.

Another aim of the invention is to reach aforementioned features by means of using a linear movement point of the mechanism.

Yet another aim of the invention is to define a reliable solar trough system whose production and practice are easy and cost effective.

DESCRIPTION OF DRAWINGS

Examples of the solar trough systems of the state of art and of the invention are shown in the annexed drawings wherein.

The parts in the figures are individually enumerated and the corresponding terms of reference numbers are as follows:
Reflector surface (1)
Thermal receiver (2)
Support bar (3)
Connection element (4)
Focal axis (F)
Thermal receiver axis (T)
Support mechanism (M)
Route (R)
Route points (R1, R2)
First arm (L1)
Second arm (L2)
Third arm (L3)
Fixed points (P1, P2)
Movable points (P3, P4)
Linear movement point (E1)

DESCRIPTION OF THE INVENTION

Figure 1:
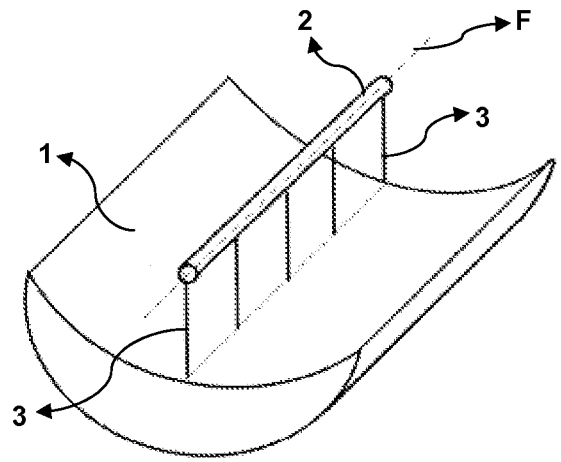
FIG. 1 is a perspective view of a part of a solar trough system of the state of art.
Figure 2:
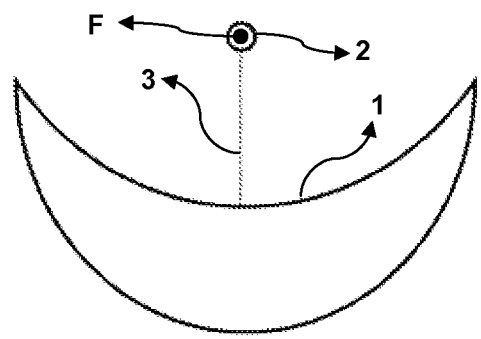
FIG. 2 is a side view of the system shown in FIG. 1.

FIGS. 1 and 2 show different views of a solar trough system of the state of art. In this system, at least one reflector surface (1), which directs the beams coming from the sun to the focal axis (F), is provided. The surface (1) has a structure in the shape of trough (preferably in the parabolic geometry), and at least one thermal receiver (2) is disposed at the focal axis (F) (coaxial with the focal axis (F) and extends along the reflector (1)). (As an example to the most common usage, the thermal receiver (2) comprises two nested tubes where a vacuum environment is disposed in the space therebetween. A fluid is passed through the tube, which is in the inner portion, the thermal conductivity of which is high and which is called as transfer tube, for heat transfer. Outer transparent (preferably of glass) tube ensures that beams coming from the reflector reach directly to the transfer tube. The temperature of the transfer tube and of the fluid inside it increases by this way. Vacuum space is defined between the transfer tube and transparent tube for preventing heat loss from transfer tube to the outside of it by convection.)

Thanks to construction of the solar trough system at north-south direction and directing the reflector surface (1) to the sun all day long (by turning at east-west direction), beams coming from the sun hit to the reflector surface (1) and are concentrated on the thermal receiver (2) and heat energy is obtained therefrom. (In an exemplary embodiment, it is ensured that fluid passing through the receiver (2) reaches to very high temperatures and the heat energy is converted into the other kinds of energy (motion, electric, etc.) by taking advantage of the fluid in high temperature.) Moreover, in this solar trough system, the reflector surface (1) can rotate around a fixed thermal receiver (2) (in other words around the focal axis (F)) as well as the surface (1) and the receiver (2) can move together.

Figure 3:
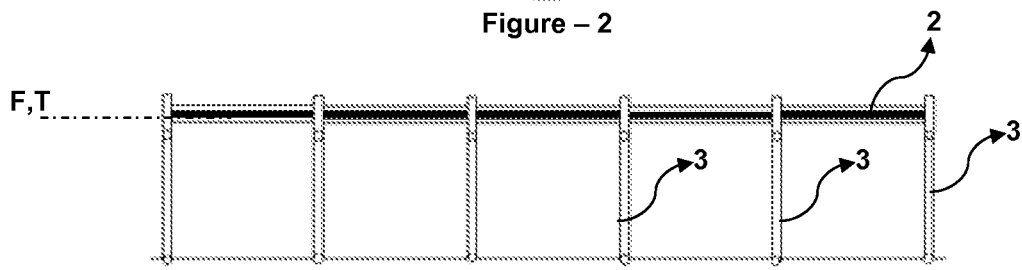
FIG. 3 is a side view of a position of a thermal receiver and support bars in a solar trough system of the state of art.
Figure 4:
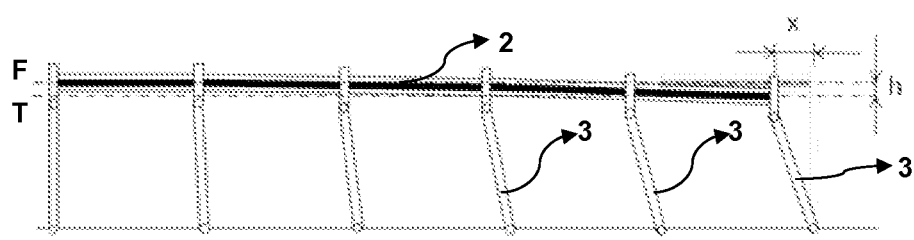
FIG. 4 is a side view of another position of a thermal receiver and support bars in a solar trough system of the state of art.

As shown in FIGS. 1-4, in the solar trough system, a plurality of support bars (3) which try to hold the thermal receivers (2) at a certain focal axis are provided. The receiver (2) is on the one end of these bars (3) and the other end of each bar (3) is connected to a fixed point (this point can be on the movable trough [if the surface (1) and the receiver (2) rotates together] or on the fixed ground [if the surface (1) rotates around the receiver (2)]). FIG. 3 shows the state in which the axis (T) of the thermal receiver (2) is coincided with the focal axis (F) of the reflector (1). In this case, the length of the thermal receiver (2) (because of the high temperature on it) is the longest. In other words, in the state of art, the coincided state of two axes (F, T) is reached in the condition that the receiver (2) is in the hottest state. This is obtained at the highest sunlight level. However when the sunlight level decreases, as shown in FIG. 4, the length of the receiver is shortened in a certain amount (shown as "x"), two axes (F, T) come into a state that they are distanced from each other, a certain amount of deformation (shown as "h") is occurred in the receiver (2). In this position, the bars (3) are seen to come in different angles. Herein, in order to prevent the state shown in FIG. 4, the mechanism of the invention, details of which are explained below, are developed.

Figure 5:
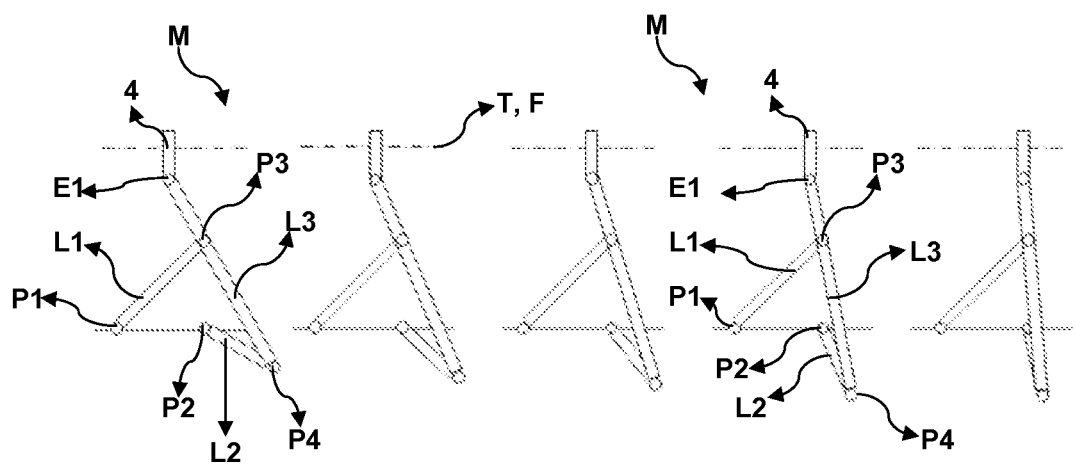
FIG. 5 is a side view of different positions of support mechanism of the invention.

The intended use of the mechanism of the invention is to hold supported thermal receiver (2) axis (T) coaxial with the reflector focal axis (F) along the solar trough (during getting longer and shorter of the thermal receiver (2) due to expansion). FIG. 5 shows views of different positions of the support mechanism (M) of the invention. This support mechanism (M) comprises first and second arms (L1, L2), one end of each of which is connected to two fixed points (P1, P2) with swivel joint; a third arm (L3) which is connected to the other ends of these two arms (L, L2) from two points (P3, P4) with swivel joint. This mechanism (M) is "four-bar" mechanism formed by three movable arms (L1, L2, L3) and a fixed arm (fixed portion between P1 and P2).

Figure 6:
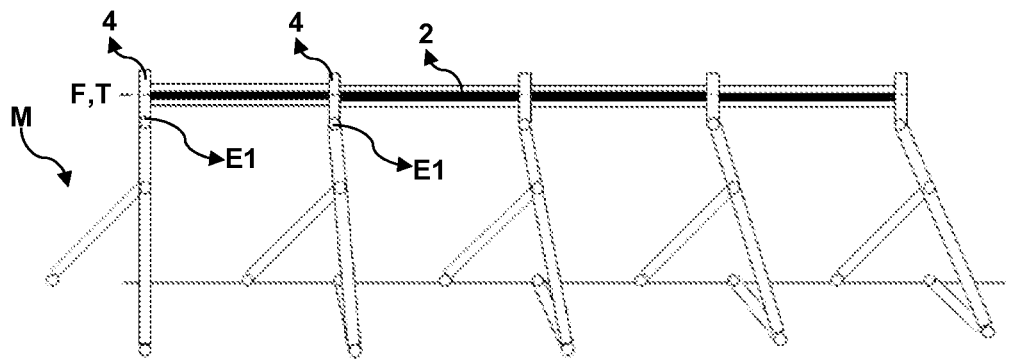
FIG. 6 is a side view of support mechanism of the invention and thermal receiver, which is connected to it.
Figure 7:
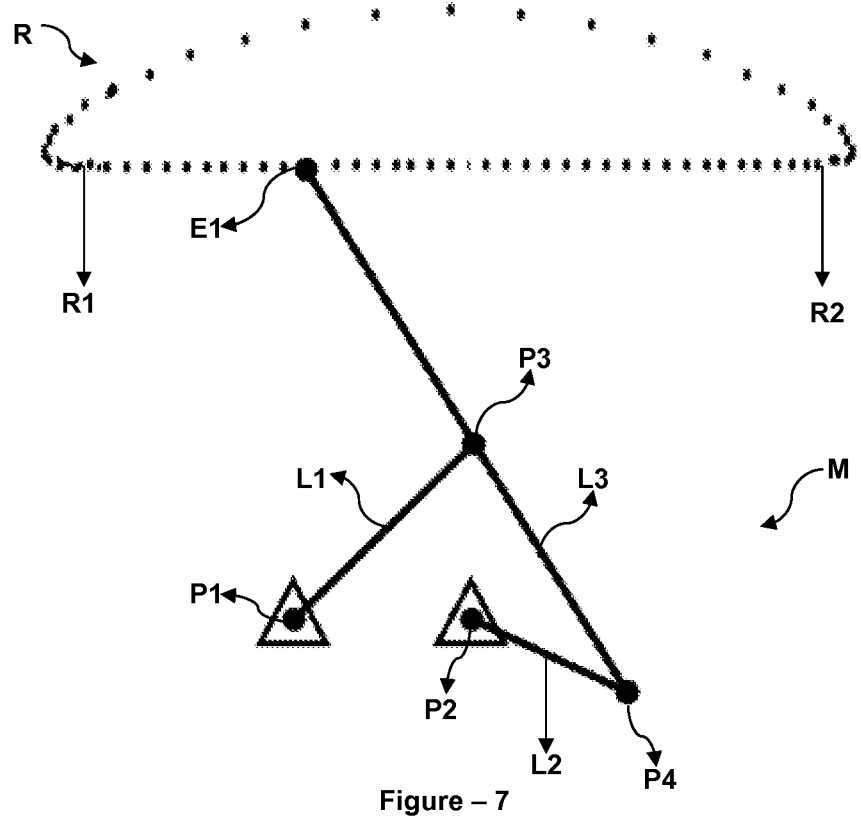
FIG. 7-9 are different examples belonging to the support mechanisms of the invention.

A point (E1) on the third arm (L3), which moves by the rotation of the first and the second arms (L1, L2) in the support mechanism (M), can linearly move between two certain points on the route it drew. An example according to this is shown in FIG. 7. In this example, it is arranged such that the length of the first arm (L1) is 2½ units; the length of the second arm (L2) is 1 unit; the length of the third arm (L3) (between E1-P4) is 5 units; the distance between "P3" and "E1" points is 2½ units; the distance between "P1" and "P2" points is 2 units. During the movement of this mechanism (M), "E1" point linearly moves between two points (R1-R2) on the full tour movement route (R). In this case, considering that expansion amount of the thermal receiver (2) is within the distance between these two points (R1, R2) and the thermal receiver (2) is connected to the "E1" point, the arms (L1, L2, L3) oscillating during a thermal receiver (2) are getting longer and shorter, but the receiver axis (T) is not changed and the axis (T) is not left from the focal axis (F). This state ensures the receiver (2) to get longer and shorter easily along its axis (T) as well as forms a reliable support structure for the receiver (2) held by a plurality of mechanism (M). (Views of this mechanism in different positions with fixed connection element rigidly to the receiver (2) are shown in FIG. 5 and with the receiver (2) and the connection element (4) also shown in FIG. 6. Herein "E1" point is connected to the receiver (2) directly or indirectly (via the connection element (4)) with swivel joint.)

This invention can be realized with a mechanism (M) having aforesaid length rates as well as by using the linear movement points (these points can be described as "E1") on the third arm (L3) of the different four-bar mechanisms. In other words, the invention is realized by a thermal receiver (2) connected on the linear movement point (E1) on the third arm (L3) of a four-bar mechanism with swivel joint.

Figure 8:
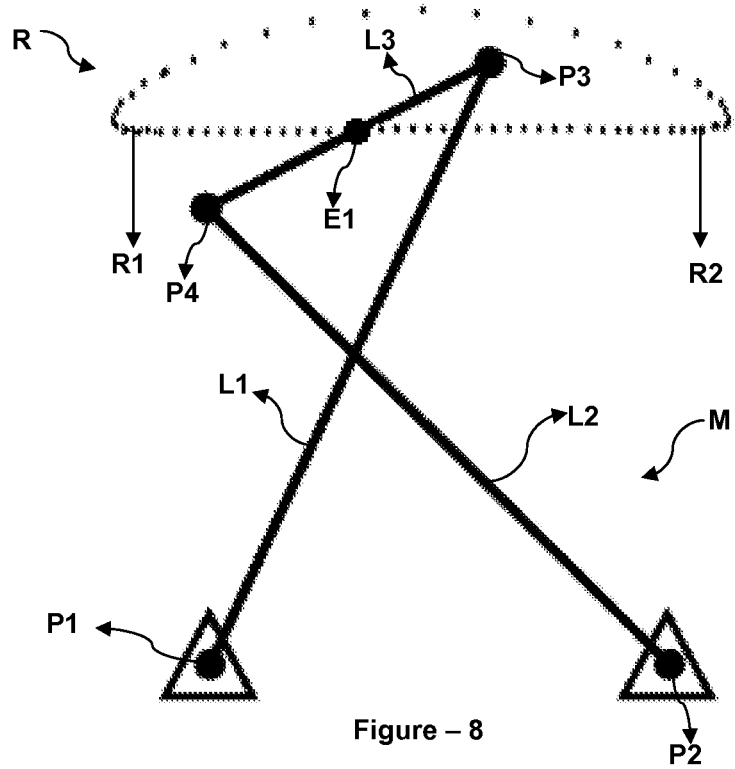

Four bar mechanism in FIG. 8 can be given as another example to the mechanism (M) of the invention. In this example, it is arranged such that the length of the first arm (L1) is 5 units; the length of the second arm (L2) is 5 units; the length of the third arm (L3) is 2 units; "E1" point is midpoint of the third arm (L3); the distance between "P1" and "P2" points is 4 units. During the movement of this mechanism (M), "E1" point linearly moves between two points (R1-R2) on the full tour movement route (R). In this case, considering that expansion amount of the thermal receiver (2) is within the distance between these two points (R1, R2) and the thermal receiver (2) is connected to the "E1" point, the arms (L1, L2, L3) oscillate during a thermal receiver (2) are getting longer and shorter, but the receiver axis (T) is not changed and the axis is not left from the focal axis (F).

Figure 9:
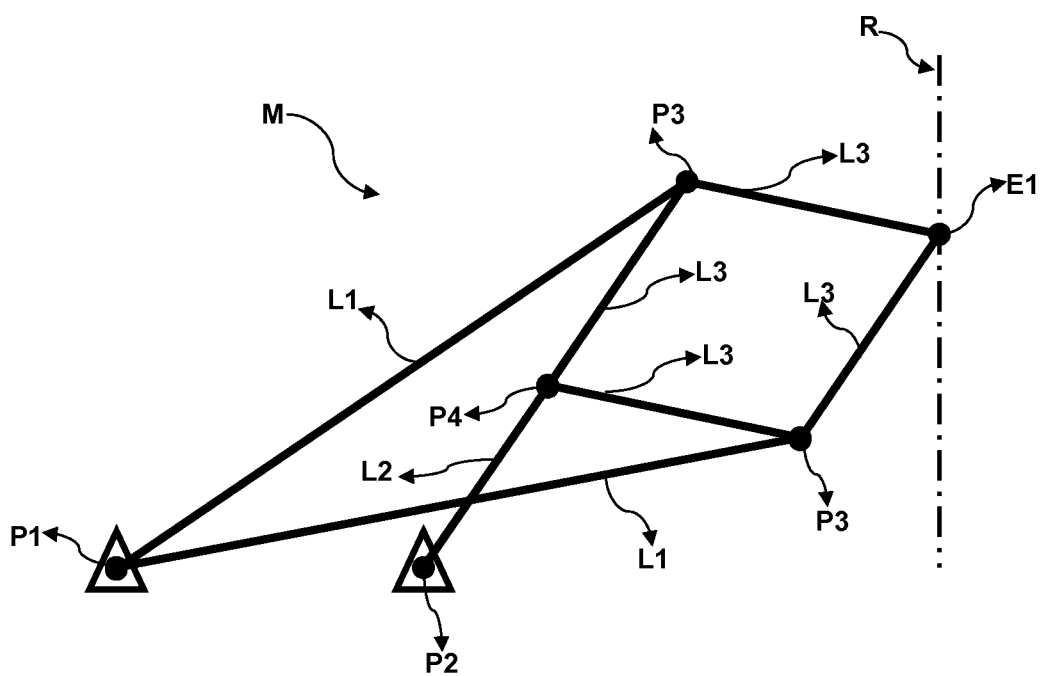

FIG. 9 shows another example of the support mechanism (M) of the invention. The mechanism in the example is a mechanism formed by attachments done on the aforesaid four-bar mechanism (L1, L2, L3, P1-P2). In this mechanism, two four-bar mechanisms, which commonly use the second arm (L2) and have two (at the same length) first arms (L1) (at the same length) which are connected to the fixed "P1" point with swivel joint, are provided. In addition, swivel jointed junction point of ends of two additional third arms (L3) (at the same length), which are connected to two movable "P3" points with swivel joint, forms linear movement point (E1). In this mechanism (M) the oscillation of the arms (L1, L2, L3) and the route (R) of "E1" point are linear; therefore, the invention is realized by connection of the thermal receiver (2) to the point (E1) with swivel joint.

The invention claimed is:

1. A solar trough system comprising: at least one trough-shaped reflector surface directing beams coming from the sun to the focal axis; at least one thermal receiver disposed at the focal axis and extending along the reflector surface; and a support mechanism comprising at least one first arm and at least one second arm, one end of each of which is connected to two fixed points with a fixed swivel joint; at least one third arm which is connected to an other end of the respective first and second arms at a first movable point and a second movable point with moveable swivel joints;

the thermal receiver being connected to a linear movement point, which moves with rotation of the first and second arms, on the third arm with a thermal receiver swivel joint;

wherein the first arm and second arm are rotatable and each of the first arm and the second arm has a fixed length; and wherein the fixed length of the first arm is 2½ units; the fixed length of the second arm is 1 unit; a length of the third arm is 5 units; a distance between the first movable point and the linear movement point is 2½ units; and a distance between the two fixed points is 2 units.

2. A solar trough system according to claim 1 wherein the support mechanism comprises two four-bar mechanism using the second arm commonly, the two four-bar mechanism comprising two first arms connected to a first fixed point of the two fixed points with the fixed swivel joint, and two third arms; and wherein the thermal receiver is connected to the swivel jointed linear movement point of two additional third arms which are connected to two first movable points with the moveable swivel joints.

3. A solar trough system comprising:

at least one trough-shaped reflector surface directing beams coming from the sun to the focal axis; at least one thermal receiver disposed at the focal axis and extending along the reflector surface; and a support mechanism comprising at least one first arm and at least one second arm, one end of each of which is connected to two fixed points with a fixed swivel joint; at least one third arm which is connected to an other end of the respective first and second arms at a first movable point and a second movable point with moveable swivel joints;

the thermal receiver being connected to a linear movement point, which moves with rotation of the first and second arms, on the third arm with a thermal receiver swivel joint; and wherein the fixed length of the first arm is 5 units; the fixed length of the second arm is 5 units; a length of the third arm is 2 units; the linear movement point is a midpoint of the third arm; and the distance between the two fixed points is 4 units.

4. A solar trough system according to claim 3 wherein the support mechanism comprises two four-bar mechanism using the second arm commonly, the two four-bar mechanism comprising two first arms connected to a first fixed point of the two fixed points with the fixed swivel joint, and two third arms; and wherein the thermal receiver is connected to the swivel jointed linear movement point of two additional third arms which are connected to two first movable points with the moveable swivel joints.

5. A solar trough system comprising:

at least one trough-shaped reflector surface directing beams coming from the sun to the focal axis; at least one thermal receiver disposed at the focal axis and extending along the reflector surface; and a support mechanism comprising at least one first arm and at least one second arm, one end of each of which is connected to two fixed points with a fixed swivel joint; at least one third arm which is connected to an other end of the respective first and second arms at a first movable point and a second movable point with moveable swivel joints;

the thermal receiver being connected to a linear movement point, which moves with rotation of the first and second arms, on the third arm with a thermal receiver swivel joint; and wherein the support mechanism comprises two four-bar mechanism using the second arm commonly, the two four-bar mechanism comprising two first arms connected to a first fixed point of the two fixed points with the fixed swivel joint, and two third arms; and wherein the thermal receiver is connected to the swivel jointed linear movement point of two additional third arms which are connected to two first movable points with the moveable swivel joints.

6. A solar trough system according to claim 5 wherein the first arm and the second arm are rotatable and each of the first arm and the second arm has a fixed length.

7. A solar trough system according to claim 6 wherein: the fixed length of the first arm is 2½ units; the fixed length of the second arm is 1 unit;

a length of the third arm is 5 units; a distance between the first movable point and the linear movement point is 2½ units; and a distance between the two fixed points is 2 units.

8. A solar trough system according to claim 6 wherein the fixed length of the first arm is 5 units; the fixed length of the second arm is 5 units; a length of the third arm is 2 units; the linear movement point is a midpoint of the third arm; and the distance between the two fixed points is 4 units.

* * * * *